United States Patent
Jaleel et al.

(10) Patent No.: US 9,286,128 B2
(45) Date of Patent: Mar. 15, 2016

(54) PROCESSOR SCHEDULING WITH THREAD PERFORMANCE ESTIMATION ON CORES OF DIFFERENT TYPES

(71) Applicant: Intel Corporation, Santa Clara, CA (US)

(72) Inventors: Aamer Jaleel, Cambridge, MA (US); Kenzo Van Craeynest, Hudson, MA (US); Paolo Narvaez, Wayland, MA (US); Joel Emer, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/843,496

(22) Filed: Mar. 15, 2013

(65) Prior Publication Data

US 2014/0282565 A1    Sep. 18, 2014

(51) Int. Cl.

| | |
|---|---|
| *G06F 9/46* | (2006.01) |
| *G06F 9/50* | (2006.01) |
| *G06F 9/38* | (2006.01) |
| *G06F 11/30* | (2006.01) |
| *G06F 9/48* | (2006.01) |

(52) U.S. Cl.
CPC ............ *G06F 9/5044* (2013.01); *G06F 9/3836* (2013.01); *G06F 9/3851* (2013.01); *G06F 11/30* (2013.01); *G06F 9/4881* (2013.01)

(58) Field of Classification Search
CPC ...................................................... G06F 9/4881
See application file for complete search history.

(56) References Cited

U.S. PATENT DOCUMENTS

| | | | | |
|---|---|---|---|---|
| 2012/0198459 | A1* | 8/2012 | Bohrer et al. | 718/102 |
| 2014/0281402 | A1* | 9/2014 | Comparan et al. | 712/214 |

OTHER PUBLICATIONS

Kenzo VanCraeynest, Aamer Jaleel, Lieven Eeckhout, Paolo Narvaez, Joel Emer, Scheduling Heterogenous Multi-cores through Performance Impact Estimation (PIE), pp. 20-31.*

* cited by examiner

*Primary Examiner* — Camquy Truong
(74) *Attorney, Agent, or Firm* — Nicholson De Vos Webster & Elliott, LLP

(57) ABSTRACT

A processor is described having an out-of-order core to execute a first thread and a non-out-of-order core to execute a second thread. The processor also includes statistics collection circuitry to support calculation of the following: the first thread's performance on the out-of-order core; an estimate of the first thread's performance on the non-out-of-order core; the second thread's performance on the non-out-of-order core; an estimate of the second thread's performance on the out-of-order core.

20 Claims, 5 Drawing Sheets

PROCESSOR SCHEDULING WITH THREAD PERFORMANCE ESTIMATION ON CORES OF DIFFERENT TYPES

FIELD OF INVENTION

The field of invention pertains to the computing sciences generally, and, more specifically, to processor scheduling with thread performance estimation on cores of different types.

BACKGROUND

Figure 1:
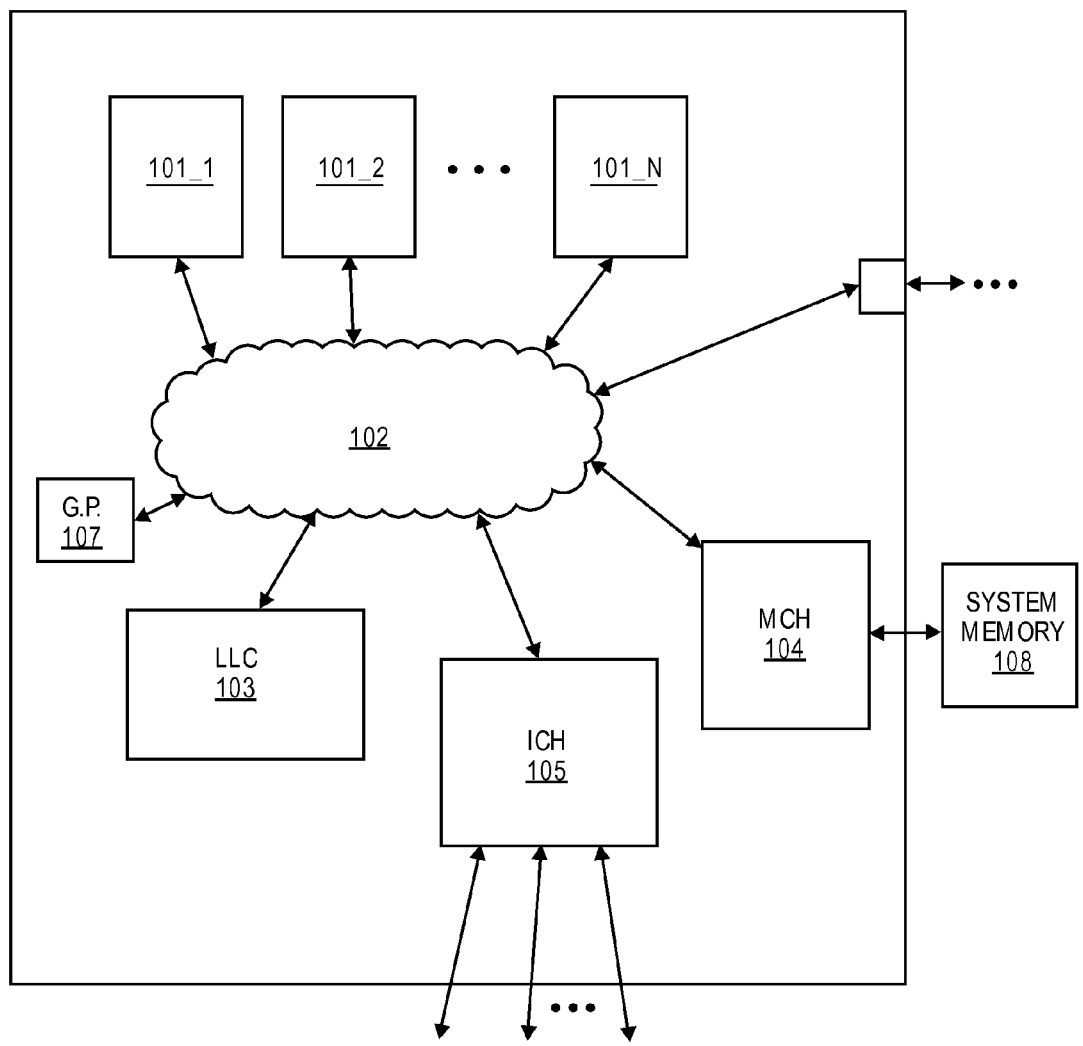

FIG. 1 shows the architecture of an exemplary multi-core processor 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor before instructions and/or data are evicted to system memory 108. Each core typically has one or more of its own internal caching levels.

The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Power management circuitry (not shown) manages the performance and power states of the processor as a whole ("package level") as well as aspects of the performance and power states of the individual units within the processor such as the individual cores 101_1 to 101_N, graphics processor 107, etc. Other functional blocks of significance (e.g., phase locked loop (PLL) circuitry) are not depicted in FIG. 1 for convenience.

Figure 2:
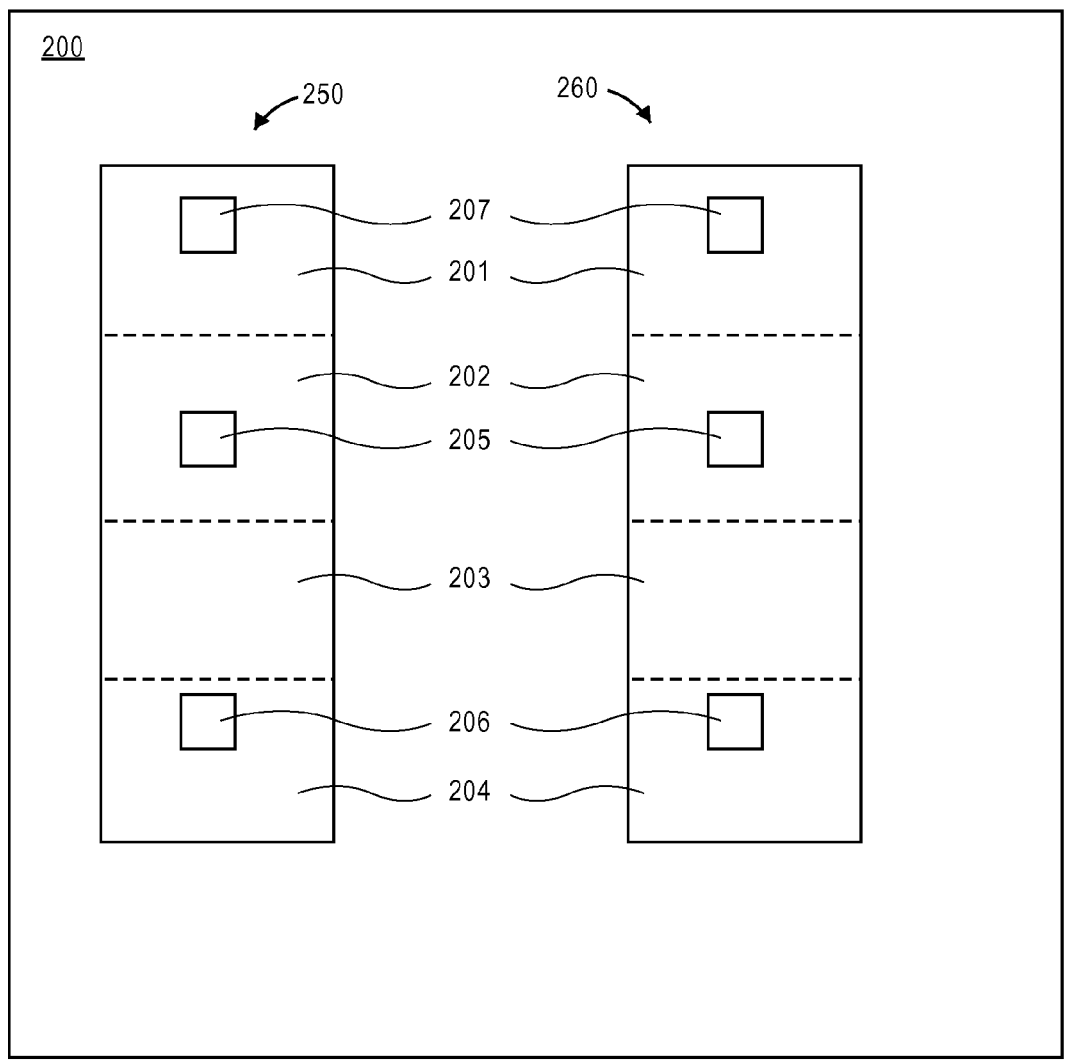

FIG. 2 shows an exemplary embodiment 200 of one of the processing cores of FIG. 1. As observed in FIG. 2, each core includes two instruction execution pipelines 250, 260. Each instruction execution pipeline 250, 260 includes its own respective: i) instruction fetch stage 201; ii) data fetch stage 202; iii) instruction execution stage 203; and, iv) write back stage 204.

The instruction fetch stage 201 fetches "next" instructions in an instruction sequence from a cache, or, system memory (if the desired instructions are not within the cache). Instructions typically specify operand data and an operation to be performed on the operand data. The data fetch stage 202 fetches the operand data from local operand register space, a data cache or system memory. The instruction execution stage 203 contains a set of functional units, any one of which is called upon to perform the particular operation called out by any one instruction on the operand data that is specified by the instruction and fetched by the data fetch stage 202. The write back stage 204 "commits" the result of the execution, typically by writing the result into local register space coupled to the respective pipeline.

In order to avoid the unnecessary delay of an instruction that does not have any dependencies on earlier "in flight" instructions, many modern instruction execution pipelines have enhanced data fetch and write back stages to effect "out-of-order" execution. Here, the respective data fetch stage 202 of pipelines 250, 260 is enhanced to include data dependency logic 205 to recognize when an instruction does not have a dependency on an earlier in flight instruction, and, permit its issuance to the instruction execution stage 203 "ahead of", e.g., an earlier instruction whose data has not yet been fetched.

Moreover, the write-back stage 204 is enhanced to include a re-order buffer 206 that re-orders the results of out-of-order executed instructions into their correct order, and, delays their commitment to the physical register file at least until a correctly ordered consecutive sequence of instruction execution results have retired. In order to further support out-of-order execution, results held in the re-order buffer 206 can be fed back to the data fetch stage 202 so that later instructions that depend on the results can also issue to the instruction execution stage 203.

The enhanced instruction execution pipeline is also observed to include instruction speculation logic 207 within the instruction fetch stage 201. Instruction sequences branch out into different paths depending on a condition such as the value of a variable. The speculation logic 207 studies the upcoming instruction sequence, guesses at what conditional branch direction or jump the instruction sequence will take (it guesses because the condition that determines the branch direction or jump may not have been executed or committed yet) and begins to fetch the instruction sequence that flows from that direction or jump. The speculative instructions are then processed by the remaining stages of the execution pipeline.

Here, the re-order buffer 206 of the write back stage 204 will delay the commitment of the results of the speculatively executed instructions until there is confirmation that the original guess made by the speculation logic 207 was correct. Once confirmation is made that the guess was correct, the results are committed to the architectural register file. If it turns out the guess was wrong, results in the re-order buffer 206 for the speculative instructions are discarded ("flushed") as is as the state of any in flight speculative instructions within the pipeline 200. The pipeline 200 then re-executes from the branch/jump with the correct sequence of instructions.

FIGURE

The following description and accompanying drawings are used to illustrate embodiments of the invention.

Figure 3:
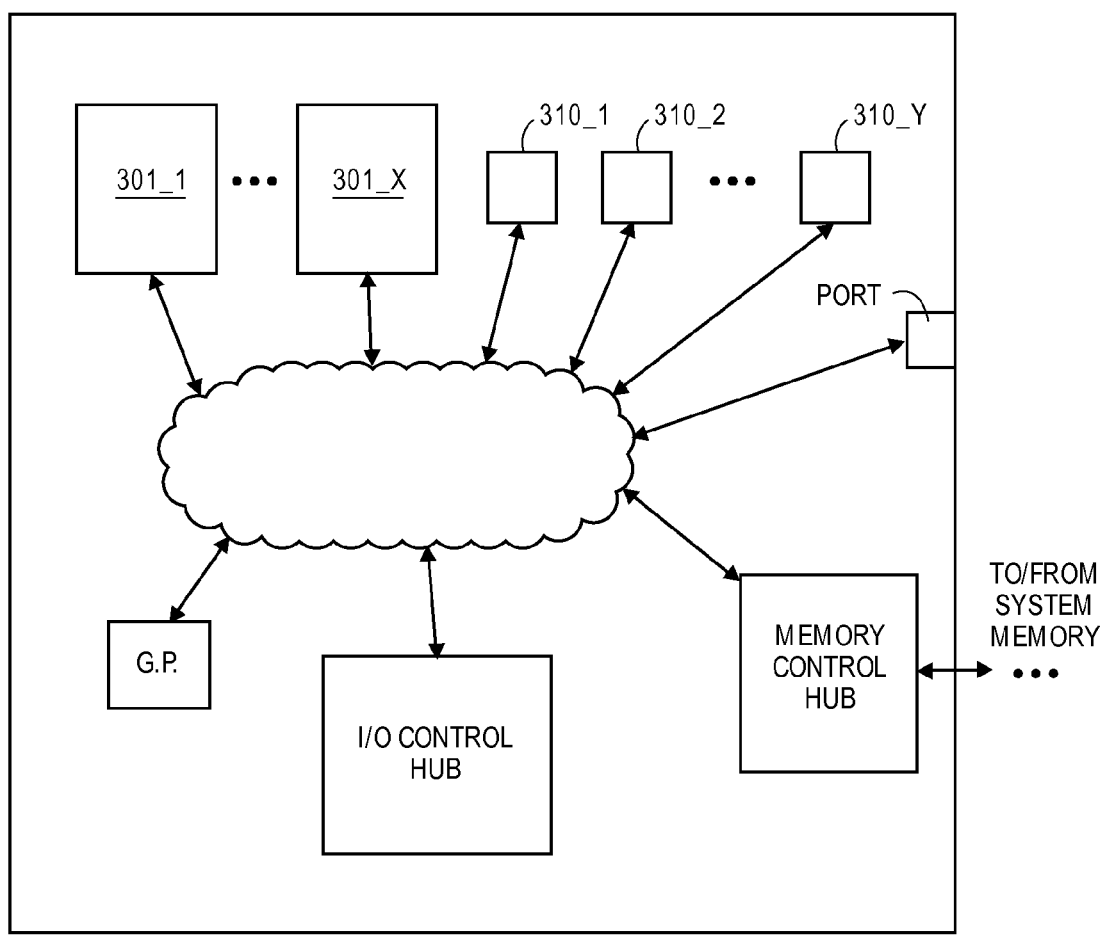
Figure 4:
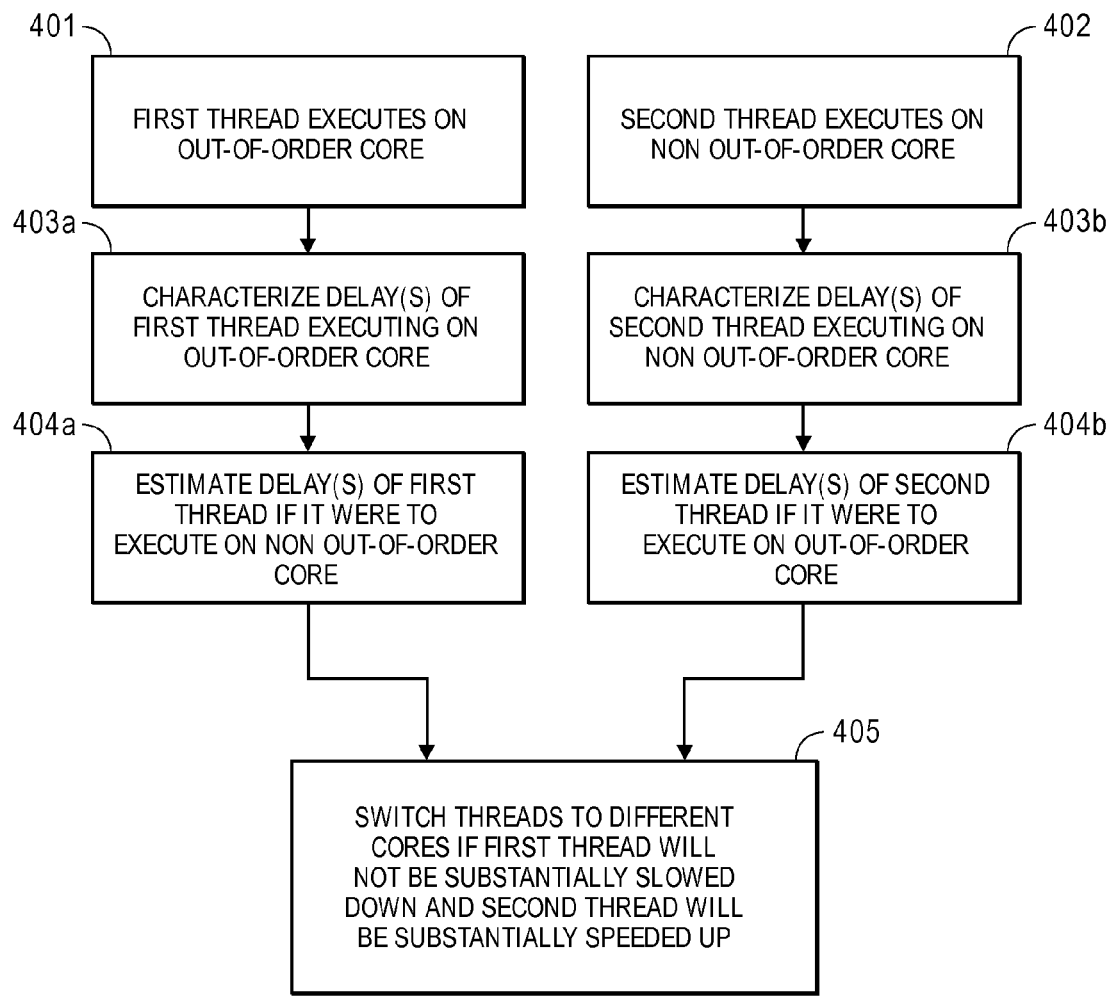
Figure 5:
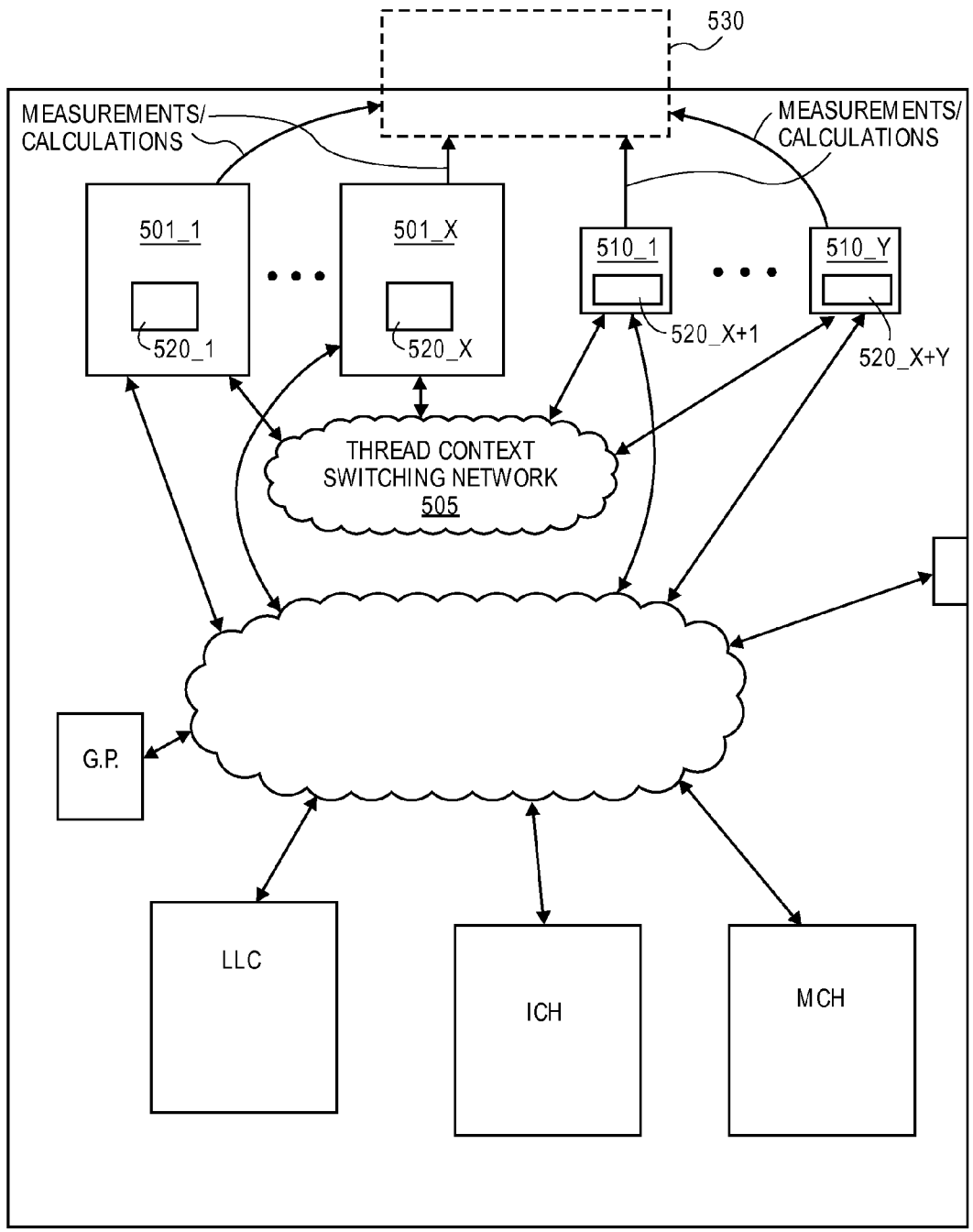

FIG. 1 shows a processor (prior art);
FIG. 2 shows an instruction execution pipeline (prior art);
FIG. 3 shows a processor having different core types;
FIG. 4 shows a process for scheduling threads on the processor;
FIG. 5 shows a processor having different cores types that can implement the scheduling process of FIG. 4.

DETAILED DESCRIPTION

The number of logic transistors manufactured on a semiconductor chip can be viewed as the semiconductor chip's fixed resource for processing information. A characteristic of the processor and processing core architecture discussed above with respect to FIGS. 1 and 2 is that an emphasis is placed on reducing the latency of the instructions that are processed by the processor. Said another way, the fixed resources of the processor design of FIGS. 1 and 2, such as the out-of-order execution enhancements made to each of the pipelines, have been devoted to running a thread through the pipeline with minimal delay.

The dedication of logic circuitry to the speed-up of currently active threads is achieved, however, at the expense of the total number of threads that the processor can simultaneously process at any instant of time. Said another way, if the logic circuitry units of a processor were emphasized differently, the processor might be able to simultaneously process more threads than a processor of FIG. 1 whose processing core is designed according to the architecture of 2. For example, if the logic circuitry resources of the out-of-order execution enhancements were removed, the "freed up" logic circuitry could be re-utilized to instantiate more processing cores within the processor that do not entertain out-of-order execution. With more such processing cores, the processor could simultaneously execute more instructions and therefore more threads.

FIG. 3 shows a processor 300 that integrates both "out-of-order" processing cores 301_1 to 301_X and "non out-of-order" processing cores 310_1 to 310_Y onto a single semiconductor die. The "out-of-order" processing cores 301_1 to 301_X each have one or more instruction execution pipelines that support "out-of-order" execution, and, the "non out-of-order" processing cores 310_1 to 310_Y each have one or more instruction execution pipelines that do not support "out-of-order" execution.

Because of the additional logic needed to support out-of-order execution, the out-of-order processing cores 301_1 to 301_X may be bigger than the non out-of-order execution cores 310_1 to 310_Y. Limiting the number of out-of-order execution cores "frees-up" more semiconductor surface so that, e.g., comparatively more non out-of-order execution cores can be instantiated on the die. So doing permits the processor as a whole to concurrently execute more threads.

An issue with having different core types on a same processor is overall processor throughput. Notably, the performance of certain types of threads may be noticeably "sped-up" if run on an "out-of-order" core whereas other types of threads may not be. Ideally, the former types of threads are run on the "out-of-order" core(s) while the later types of threads are run on the "non-out-of-order" cores.

FIG. 4 shows a process for scheduling threads on a processor having both "out-of-order" core(s) and "non-out-of-order" core(s). A first thread is executing on an out-of-order core 401 and a second thread is executing on a non out-of-order core 402. The delays encountered in the execution of each thread are characterized for their respective cores 403a,b (e.g., by way of statistical measurement). An estimate of the delays that would be encountered for each thread if it were executed on a core of different type is also determined 404a,b. The characterizations (both the estimated and measured) are then compared. The threads are then switched to operate on different cores if the overall execution of both threads in the processor would improve by doing so 405. For example, if the first thread is a type of thread that does not experience much speed-up because of the out-of-order capabilities of the out-of-order core but the second thread is a type of thread that would experience noticeable speed-up if executed on the out-of-order core, the threads are switched so that the first thread executes on the non-out-of-order core and the second thread executes on the out-of-order core.

Those of ordinary skill will appreciate that the methodology of FIG. 4 is simplistic for ease of explanation. That is, the overall approach of FIG. 4 may be applied to various processor architectures having different combinations of out-of-order cores and non-out-of-order cores than simply one of each. For example, a processor may have four out-of-order cores and four non out-of-order cores. In this case, the four threads having the largest (measured or estimated) speed up on an out-of-order core may be scheduled on the out-of-order cores. Similarly, as another example, two threads having the largest speed-up from execution on an out-of-order core may be scheduled on the out-of-order cores of a processor having two out-of-order cores and six non out-of-order cores.

Note that all these examples simplify the cores as being able to execute only a single thread. As is understood in the art, each core may be multi-threaded by way of simultaneous execution (e.g., with more than one instruction execution pipeline per core) and/or concurrent execution (e.g., where a single instruction execution pipeline switches multiple threads in-and-out of active execution over a period of time). The number of measurements, estimations and thread switching options to different core type scales with the number of threads supported by the individual cores.

Previous work by others has focused on the intensity of memory access instructions within the thread ("memory intensity") to guide workload scheduling. This policy is based on the intuition that compute-intensive workloads benefit more from the high computational capabilities of an out-of-order core while memory-intensive workloads execute more efficiently on a non out-of-order core while for memory.

While memory intensity alone can provide a good indicator for scheduling some memory-intensive workloads onto a non-out-of-order core, such practice can significantly slow-down other memory-intensive workloads. Similarly, some compute-intensive workloads observe a significant slow-down on a non-out-of-order core while compute-intensive workloads have reasonable slowdown when executing on a small core. This behavior illustrates memory intensity (or compute intensity) alone is not a good indicator to guide application scheduling on different types of cores.

The performance behavior of workloads on non-out-of-order and out-of-order cores can be explained by the design characteristics of each core. Out-of-order cores are particularly suitable for workloads that require instruction level parallelism (ILP) to be extracted dynamically or have a large amount of simultaneously outstanding misses (memory level parallelism (MLP)). On the other hand, non out-of-order cores are suitable for workloads that have a large amount of inherent ILP (that is, ILP that need not be realized with out-of-order execution). This implies that performance on different cores can be correlated to the amount of MLP and ILP prevalent in a thread. For example, consider a memory-intensive workload that has a large amount of MLP. Executing such a memory-intensive workload on a non-out-of-order core can result in significant slowdown if the core does not expose the MLP. On the other hand, a compute-intensive workload with large amounts of inherent ILP may have only a modest slowdown on a non-out-of-order core and need not require the out-of-order core.

As such, in various embodiments, the slowdowns (or speedups) when moving threads between different core types can be correlated to the amount of MLP and ILP realized on a target core. As such, the performance on a target core type can be estimated by predicting the MLP and ILP on that core.

According to one embodiment, referring to FIG. 4, the measured and estimated characterization 403a,b 404a,b of a thread's delay(s) takes the form of a cycles per instruction (CPI) stack. A CPI stack not only determines the average number of machine cycles consumed per instruction but also breaks down the average number of machine cycles into different components of underlying machine operations that contribute to the delays being encountered by the executing instructions. In a further embodiment, the components of the CPI stack correspond to MLP and "base CPI" ($CPI_{base}$). Here, $CPI_{base}$ corresponds to the component of CPI associated with instructions other than memory instructions that result in a data cache miss (e.g., branch prediction misses, TLB misses, etc.). Said another way, $CPI_{base}$ essentially lumps together non-memory access related delays in the instruction stream.

As such, in one embodiment, the measured CPI of the respected cores (processes 403*a,b* of FIG. 4) are expressed as:

$$CPI_{non\text{-}out\text{-}of\text{-}order} = \text{average } CPI_{base\_non\text{-}out\text{-}of\text{-}order} + \text{average } CPI_{mem\_non\text{-}out\text{-}of\text{-}order};$$

Eqn. 1a $$CPI_{out\text{-}of\text{-}order} = \text{average } CPI_{base\_out\text{-}of\text{-}order} + \text{average } CPI_{mem\_out\text{-}of\text{-}order};$$

Eqn. 1b where: 1) average $CPI_{base\_non\text{-}out\text{-}of\text{-}order}$ is the average measured $CPI_{base}$ of a thread executing on a non out-of-order core; 2) average $CPI_{mem\_non\text{-}out\text{-}of\text{-}order}$ is the average CPI of memory access instructions executing on the thread executing on the non out-of-order core; 3) average $CPI_{base\_out\text{-}of\text{-}order}$ is the average measured $CPI_{base}$ of a thread executing on an out-of-order core; and, 4) average $CPI_{mem\_out\text{-}of\text{-}order}$ is the average CPI of memory access instructions executing on the thread executing on the out-of-order core. The measurements can be made on the respective cores (i.e., $CPI_{non\text{-}out\text{-}of\text{-}order}$ can be determined on the non-out-of-order core and $CPI_{out\text{-}of\text{-}order}$ can be determined on the out-of-order core).

Likewise, the estimated CPI of the respected cores (processes 404*a,b* of FIG. 4) is determined as:

$$CPI\_EST_{non\text{-}out\text{-}of\text{-}order} = \text{estimate of CPI of a thread currently executing on an out-of-order core if it were to be executed on a non out-of-order core} = CPI\_EST_{base\_non\text{-}out\text{-}of\text{-}order} + CPI\_EST_{mem\_non\text{-}out\text{-}of\text{-}order}$$

2a $$CPI\_EST_{out\text{-}of\text{-}order} = \text{estimate of CPI of a thread currently executing on a non out-of-order core if it were to be executed on an out-of-order core} = CPI\_EST_{base\_out\text{-}of\text{-}order} + CPI\_EST_{mem\_out\text{-}of\text{-}order}$$

Eqn. 2b

Respective equations and a discussion of each of the individual terms in Equations 2a and 2b are provided immediately below.

With respect to Equation 2a, $CPI\_EST_{base\_non\text{-}out\text{-}of\text{-}order}$ corresponds to the estimated base component of CPI for a thread that is currently executing on an out-of-order core if it were to be executed on a non out of order core, and, $CPI\_EST_{mem\_non\text{-}out\text{-}of\text{-}order}$ corresponds to the estimated MLP component of CPI for the same thread.

In an embodiment, $CPI\_EST_{base\_non\text{-}out\text{-}of\text{-}order}$ is calculated as:

$$CPI\_EST_{base\_non\text{-}out\text{-}of\text{-}order} = 1/(IPC\_EST_{base\_out\text{-}of\text{-}order})$$

Eqn. 3a where $IPC\_EST_{base\_out\text{-}of\text{-}order}$ corresponds to the estimated average number of base component instructions executed per clock cycle on the out-of-order core which is expressed in Eqn. 9 of the Appendix and is restated here as Eqn. 3b:

$$I\hat{P}C_{base\_small} = \sum_{i=1}^{w_{small}} i \times P[IPC = i].$$

Eqn. 3b which corresponds to the expected number of instructions issued per cycle on the non out-of order core.

Here, various instructions execution pipelines are often capable of simultaneously issuing more than one instruction for a thread at a given time. Eqn. 3b essentially attempts to estimate how many instructions will be issued in parallel for the thread if the thread were to be executed on the non-out-of-order core. Of import here is that instructions that have dependencies on one another will not issue in parallel. That is, the instruction execution pipeline will prevent an instruction from issuing in a same cycle of an earlier instruction in the stream that it has a dependency on.

Here, $i \times P[IPC=i]$ in Eqn. 3b corresponds to the probability that $i$ instructions will issue in parallel and $W_{non\text{-}out\text{-}of\text{-}order}$ corresponds to the width of the non out-of-order core. The probability of issuing $i$ instructions in parallel can be determined through observance of the "dependency distance" (D) of the thread as it is executing on the out-of-order core. Here, the dependency distance D is essentially a measure of the number of instructions that typically reside between a later instruction that has a dependency on the result of an earlier instruction. The reader is referred to the Appendix, sec. 3.2.2 ("Predicting small core ILP on a big core") for more details concerning this calculation.

In an embodiment, $CPI\_EST_{mem\_non\text{-}out\text{-}of\text{-}order}$ of Eqn. 2a can be expressed as:

$$CPI_{mem\_out\text{-}of\text{-}order}(MLP_{out\text{-}of\text{-}order}/MLP\_EST_{non\text{-}out\text{-}of\text{-}order})$$

Eqn. 3c where $CPI_{mem\_out\text{-}of\text{-}order}$ is the observed average number of cycles consumed per memory access instruction of the thread as it is executing on the out-of-order core, $MLP_{out\text{-}of\text{-}order}$ is the observed average number of simultaneous outstanding memory access instructions of the thread as it executing on the out-of-order core and $MLP\_EST_{non\text{-}out\text{-}of\text{-}order}$ is the estimated average number of simultaneous memory access instructions for the thread if it is executed on the non-out-of-order core.

In an embodiment, $MLP\_EST_{non\text{-}out\text{-}of\text{-}order}$ in Eqn. 3c above is calculated as follows for a "stall-on-use" core:

$$MLP\_EST_{non\text{-}out\text{-}of\text{-}order} = MPI_{out\text{-}of\text{-}order} \times D$$

Eqn. 3d where $MPI_{out\text{-}of\text{-}order}$ is the number of memory access instructions that resulted in a cache miss per instruction as observed for the thread as it is executing on the out-of-order core (e.g., as calculated by dividing the number of memory access instructions that resulted in a cache miss with the total number of instructions for the thread over a set time period) and D is the dependency distance for the thread as it is executing on the out-of-order core (e.g., as calculating by tracking dependency distance for each instruction having a dependency and taking the average thereof).

A stall on use core is a core that will stall the thread if an instruction has been issued but not yet executed because the data it needs is not yet available. In an embodiment $MLP\_EST_{non\text{-}out\text{-}of\text{-}order} = 1$ for a "stall-on-miss" core. A stall-on-miss core will stall a thread if a memory access instruction suffers a miss when looking into core cache(s) or core and processor cache(s) requiring a data fetch outside the core or processor.

With respect to Equation 2b above, $CPI\_EST_{base\_out\text{-}of\text{-}order}$ corresponds to the estimated base component of CPI for a thread that is currently executing on a non-out-of-order core if it were to be executed on an out of order core, and, $CPI\_EST_{mem\_out\text{-}of\text{-}order}$ corresponds to the estimated MLP component of CPI for the same thread. In an embodiment, $CPI\_EST_{base\_out\text{-}of\text{-}order}$ is expressed as:

$$CPI\_EST_{base\_out\text{-}of\text{-}order} = 1/W_{out\text{-}of\text{-}order}$$

Eqn. 4a where $W_{out\text{-}of\text{-}order}$ is the width of the out-of-order core (that is, the number of instructions that the out-of-core can issue in parallel). Here, an out-of-order core by design attempts to avoid stalls associated with data dependency issues by issuing instructions from deeper back in the instruction queue that do not have any dependency issues on current in flight instructions.

In an embodiment, $CPI\_EST_{mem\_out\text{-}of\text{-}order}$ is expressed as:

$$CPI_{mem\_non\text{-}out\text{-}of\text{-}order}(MLP_{non\text{-}out\text{-}of\text{-}order}/MLP\_EST_{out\text{-}of\text{-}order}) \quad \text{Eqn. 4b}$$

where $CPI_{mem\_non\text{-}out\text{-}of\text{-}order}$ is the observed average number of cycles consumed per memory access instruction of the thread as it is executing on the non-out-of-order core, $MLP_{non\text{-}out\text{-}of\text{-}order}$ is the observed average number of simultaneous outstanding memory access instructions of the thread as it executing on the non-out-of-order core and $MLP\_EST_{out\text{-}of\text{-}order}$ is the estimated average number of simultaneous memory access instructions for the thread if it is executed on the out-of-order core.

In an embodiment, $MLP\_EST_{out\text{-}of\text{-}order}$ is expressed as:

$$MPI_{non\text{-}out\text{-}of\text{-}order}(ROB_{size}) \quad \text{Eqn. 4c}$$

where $MPI_{non\text{-}out\text{-}of\text{-}order}$ is the number of memory access instructions that resulted in a cache miss per instruction as observed for the thread as it is executing on the non-out-of-order core (e.g., as calculated by dividing the number of memory access instructions that resulted in a cache miss with the total number of instructions for the thread over a set time period) and $ROB_{size}$ is the size of the reorder buffer of the out-of-order core.

FIG. 5 shows a basic diagram of a processor 500 having at least one out-of-order core 501_1 to 501_X and at least one non-out-of-order core 510_1 to 510_Y. Each of the cores have respective statistics tracking circuitry 520_1 to 520_X+Y to collect statistics on the threads they are respectively executing consistently with the discussion provided above. The statistics collecting circuitry 520 not only collects statistics to characterize thread delay (e.g., CPI) as it is executing on its core but also collects such statistics to estimate what the thread delay (e.g., CPI) would be if it were migrated onto a core of other type. The statistics and/or values determined therefrom (e.g., respective CPI values) are then compared for all threads being executed by the processor by scheduling intelligence 530. Scheduling intelligence 530 may be implemented entirely in hardware as electronic circuitry, entirely as software or other code that runs on the processor (e.g., on one of the cores or a micro-controller therein) or some combination of both.

If the scheduling intelligence 530 identifies a pair of threads executing on different cores where migration of the non-out-of-order core thread to the out-of-order core would cause noticeable speedup but migration of the out-of-order core thread to the non-out-of-order core would not cause noticeable slowdown the pair of threads are migrated to different respective cores. In order to migrate threads, their respective state which consists of data and control information in the respective register space of the different cores (not shown) is switched between cores. As such, switching circuitry 505 (e.g., a switching network) resides between the cores of different types to effect the switchover of state information for the two threads between the two cores. If threads are not switched internally within the processor, the respective state of switching threads may be saved externally (e.g., to system memory) and then loaded back into their new respective cores.

In an embodiment each core has scheduling intelligence circuitry to not only determine (or at least help determine) a measurement for the performance of the thread that it is executing but also the determine the estimated measurement of performance for the thread if it were to execute on a core of different type.

Although not explicitly labeled, not that the processor 500 of FIG. 5, also includes the various components discussed above with respect to FIG. 1.

The teachings herein are also supplemented with Appendix materials appearing at the end of this application. Notably, the Appendix refers to an out-of-order core as a "big" core and a non-out-of-order core as a "small" core.

As any of the logic processes taught by the discussion above may be performed with a controller, micro-controller or similar component, such processes may be implemented with program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A processor comprising:
   an out-of-order core to execute a first thread;
   a non-out-of-order core to execute a second thread;
   statistics collection circuitry to support calculation of the following:
      said first thread's performance on said out-of-order core;
      an estimate by the out-of-order core of said first thread's performance on said non-out-of-order core;
      said second thread's performance on said non-out-of-order core; and
      an estimate by the non-out-of-order core of said second thread's performance on said out-of-order core; and
   circuitry to switch the first thread to the non-out-of-order core and switch the second thread to the out-of-order core to speed up the second thread, wherein said statistics collection circuitry is to track a number of instructions between a later instruction having a dependency on an earlier instruction.

2. The processor of claim 1 wherein said processor further comprises circuitry to:
   switch the first thread to the non-out-of-order core and switch the second thread to the out-of-order core to speed up the second thread without significantly slowing down the first thread.

3. The processor of claim 2 further comprising switching circuitry between respective register space of the cores to effect said switch.

4. The processor of claim 1 wherein said statistics collection circuitry includes circuitry to collect information to determine memory access and non-memory access latency components of the first and second threads.

5. The processor of claim 1 wherein said statistics collection circuitry is to track simultaneous outstanding memory accesses.

6. The processor of claim 1 wherein said statistics collection circuitry is to track cache misses.

7. The processor of claim 1 wherein said statistics collection circuitry is to track a number of instructions between a later instruction having a dependency on an earlier instruction for the first thread and the second thread.

8. The processor of claim 1 wherein said statistics collection circuitry is to track a cycles per instruction stack.

9. A method comprising:
    executing a first thread on an out-of-order core;
    executing a second thread on a non-out-of-order core;
    tracking statistics of the first and second threads to support calculation of the following:
        said first thread's performance on said out-of-order core;
        an estimate by the out-of-order core of said first thread's performance on said non-out-of-order core;
        said second thread's performance on said non-out-of-order core; and
        an estimate by the non-out-of-order core of said second thread's performance on said out-of-order core;
    tracking a number of instructions between a later instruction having a dependency on an earlier instruction; and
    switching the first thread to the non-out-of-order core and switching the second thread to the out-of-order core to speed up the second thread.

10. The method of claim 9 further comprising:
    switching the first thread to the non-out-of-order core and switching the second thread to the out-of-order core to speed up the second thread without significantly slowing down the first thread.

11. The method of claim 9 wherein the switching comprises switching state information of the first and second threads between the cores through switching circuitry between register space between the cores.

12. The method of claim 9 further comprising collecting information to determine memory access and non-memory access latency components of the first and second threads.

13. The method of claim 9 further comprising tracking simultaneous outstanding memory accesses of the first and second threads.

14. The method of claim 9 further comprising tracking cache misses of the first and second threads.

15. The method of claim 9 further comprising tracking a number of instructions between a later instruction having a dependency on an earlier instruction for the first and second threads.

16. A computing system comprising:
    a processor comprising an out-of-order core to execute a first thread and a non-out-of-order core to execute a second thread;
    statistics collection circuitry to track a number of instructions between a later instruction having a dependency on an earlier instruction; and
    thread scheduling intelligence to switch said first thread to said non-out-of-order core and switch said second thread to said out-of-order core in light of:
        said first thread's performance on said out-of-order core;
        an estimate by the out-of-order core of said first thread's performance on said non-out-of-order core;
        said second thread's performance on said non-out-of-order core; and
        an estimate by the non-out-of-order core of said second thread's performance on said out-of-order core.

17. The computing system of claim 16 wherein said thread scheduling intelligence is at least partially implemented with software of said computing system.

18. The computing system of claim 16 wherein said thread scheduling intelligence is at least partially implemented with hardware on said processor.

19. The computing system of claim 16 wherein said thread scheduling intelligence is to track a number of instructions between a later instruction having a dependency on an earlier instruction for the first thread and the second thread.

20. The computing system of claim 16 wherein said thread scheduling intelligence is to track a cycles per instruction stack for each core.

* * * * *